United States Patent [19]

Raschke

[11] Patent Number: 4,881,635

[45] Date of Patent: Nov. 21, 1989

[54] METHOD OF AND ARRANGEMENT, FOR TRANSPORTING PIECE GOODS AND FOR ORGANIZED CHANGING THEIR POSITION

[75] Inventor: Hans D. Raschke, Hannover, Fed. Rep. of Germany

[73] Assignee: H. Bahlsens Keksfabrik KG, Hannover, Fed. Rep. of Germany

[21] Appl. No.: 96,965

[22] Filed: Sep. 11, 1987

[51] Int. Cl.⁴ .............................................. B65G 47/26
[52] U.S. Cl. .................................. 198/460; 198/461; 198/594; 198/812
[58] Field of Search ............... 198/460, 461, 462, 812, 198/594, 420

[56] References Cited

U.S. PATENT DOCUMENTS

| | | | |
|---|---|---|---|
| 3,370,693 | 2/1968 | Marsden | 198/460 |
| 4,018,326 | 4/1977 | Hardy | 198/461 |
| 4,043,442 | 8/1977 | Greenwell et al. | 198/420 X |
| 4,210,237 | 7/1980 | Gram | 198/461 X |
| 4,469,219 | 9/1984 | Cosse | 198/460 |
| 4,537,016 | 5/1985 | Shanklin et al. | 198/461 X |
| 4,565,284 | 1/1986 | Seragnoli et al. | 198/812 X |
| 4,681,523 | 7/1987 | Thelen | 198/461 X |

FOREIGN PATENT DOCUMENTS

| | | | |
|---|---|---|---|
| 1166093 | 3/1964 | Fed. Rep. of Germany | 198/461 |
| 2711039 | 9/1978 | Fed. Rep. of Germany | 198/461 |
| 3147590 | 6/1983 | Fed. Rep. of Germany | 198/461 |
| 1414427 | 11/1975 | United Kingdom | 198/461 |

Primary Examiner—Robert J. Spar
Assistant Examiner—D. Glenn Dayoan
Attorney, Agent, or Firm—Michael J. Striker

[57] ABSTRACT

A method of and an arrangement for transporting piece goods and organized changing their position, include transporting goods in a plurality of substantially parallel tracks by a transporting device from a supply conveyor to a discharge conveyor spaced from one another in a predetermined direction, determining a position of the goods by sensing means at least in the region between the supply conveyor and the transporting device, supplying the goods to the transporting device with a means value of arrival and a variance of arrival therebetween, providing in the transporting device per each track at least three transporting conveyors and a transition between two neighboring one of the transporting conveyors, changing a speed of the transporting conveyors of the transporting device, and moving a respective one of the transitions in said direction to change their position, so that by changing the position of the transitions and the speed of the transporting conveyors pieces or groups of goods can change their position separately from other pieces or groups of goods so as to be accelerated or decelerated.

45 Claims, 5 Drawing Sheets

FIG. 9

METHOD OF AND ARRANGEMENT, FOR TRANSPORTING PIECE GOODS AND FOR ORGANIZED CHANGING THEIR POSITION

BACKGROUND OF THE INVENTION

The present invention relates to a method of transporting piece goods and for organized changing their positions, especially for products of food industry. More particularly, it relates to such a method in accordance with which the goods are transported from a supply conveyor to a transporting device, then on the transporting device the goods are arranged in a predetermined position relative to one another, and then the goods are supplied by a subsequent discharge conveyor to their further treatment, for example, to a packaging machine.

The invention also relates to an arrangement for transporting piece goods and for organized change of their position, which includes a supply conveyor, a transporting device for transporting the piece goods with simultaneous organized changing of their position, and a discharge conveyor.

The processing of pieces which arrive in an irregular sequence, for example pastry pieces on automatic processing machines, such as packaging machines, which require constant arrival of the pieces or grouping of the pieces in time, for example, hose bag machines, wrapping up machines, etc. frequently a manual regrouping or collection is required, for example accumulation and subsequent separation of the individual pieces so as to provide for possibility to charge for example each chain compartment of a subsequent packaging machine.

This problem is especially complicated when the pieces arrive in several tracks and in each of these tracks in an irregular or in other words accidental and unexpected sequence, and on the other hand, must be supplied to a further processing machine for example in a plurality of rows arranged in a longitudinal direction and in a transverse direction with predetermined distances, and the accumulation of the pieces for subsequent separation in rows is not possible since the properties of the pieces (shape, sensitivity, adhesion, etc.) do not allow the accumulation (jamming).

A usual method of converting the pieces which are supplied irregularly in several tracks, into transverse rows is to orient or to accumulate the pieces on a beam or a barrier and cyclically discharge them into the rows. This is possible only for pieces with solid consistency and predetermined geometry.

For the case when the pieces are supplied strictly periodically or in other words with constant distances in the running direction, arrangements can be used which are disclosed in the German documents DE-OS 2,711,039 and DE-OS 3,147,590. In these arrangements a displaceable gap between two conveyors is moved periodically by means of curves, pulling means or fluid cylinder-piston units, and in particular in a co-running fashion exactly between two groups of pieces which must be separated from one another, so that by time- or workpiece-controlled variation of the transporting speeds, the group formation can be completely achieved.

However, the above described arrangements are incapable of forming groups from pieces which are supplied with irregular distances and in particular, in accidental unexpected fashion.

The possibility of compensating for accidental variations in the product supply is provided in the arrangement disclosed in the German document DE-OS 2,333,734. In this document the requirement is properly mentioned to influence the product supply by switching on or switching off of the prearranged machine when needed. With this arrangement, for each piece which is controlled at the outlet, a new piece must be supplied or fed at the inlet, so that it is in the position to compensate a time offset of the supplied piece.

All arrangements described in the above mentioned patents utilize a movable transition between two conveyors as a transition point, and also variable transporting speeds. They have only a short-time distributing function which is suitable for regrouping of regularly supplied or correctly withdrawn pieces. However, they do not have a simultaneous buffering function which is required for converting an accidental order of the pieces into a regular order of the pieces without inducing friction into the bottom of the transported goods.

SUMMARY OF THE INVENTION

Accordingly, it is an object of the present invention to provide a method of and an arrangement for transporting piece goods and for organized changing their positions, which avoid the disadvantages of the prior art.

More particularly, it is an object of the present invention to provide a method of and an arrangement for transporting piece goods and for organized changing of their position, which make possible, with cost-economical operational mode and relatively simple arrangement to change piece goods in several tracks in an organized manner in their position, wherein the goods can come to a transporting device in any arbitrary position relative to one another with a known average arrival rate.

Figure 6:
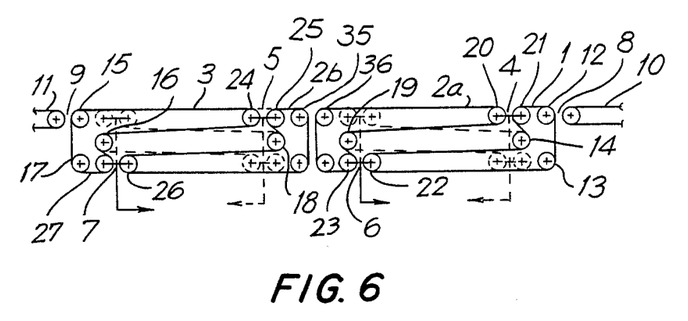
FIG. 6 is a side view of an embodiment with two synchronously operating partial conveyors in a schematic showing.

In keeping with these objects and with others which will become apparent hereinafter, one feature of the present invention resides, briefly stated, in that the goods are transported by parallel tracks composed of a supply conveyor, a transporting device and a discharge conveyor, and after organized change of their position the piece goods of each track are supplied separately or jointly to a further processing; the position of the goods is detected by means of one sensor at least at the transition point from the supply conveyor to the transporting device; the goods with known average arrival rate are supplied with accidental and different distances from one another to the transporting device wherein the distances from track to track and also on the same supply conveyor can be different; a transporting device with at least two transitions movable in a transporting direction or back per track is utilized; and by changing the position of each transition as well as the transporting speed of the transporting device, composed of at least two conveyor units as depicted in FIG. 6, each piece or group of pieces is separated from other pieces or groups of pieces even though travelling in the same track, by changing the speed during a predetermined time or path length, or in other words is accelerated or decelerated.

Figure 1:
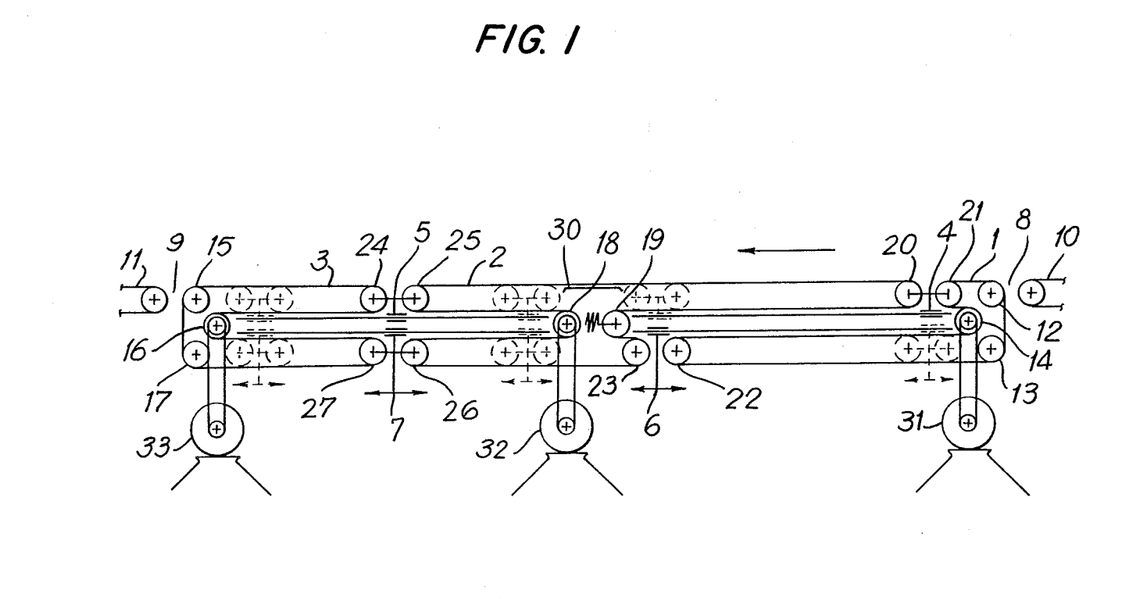
FIG. 1 is a side view which schematically shows the arrangement in accordance with the present invention.
Figure 2:
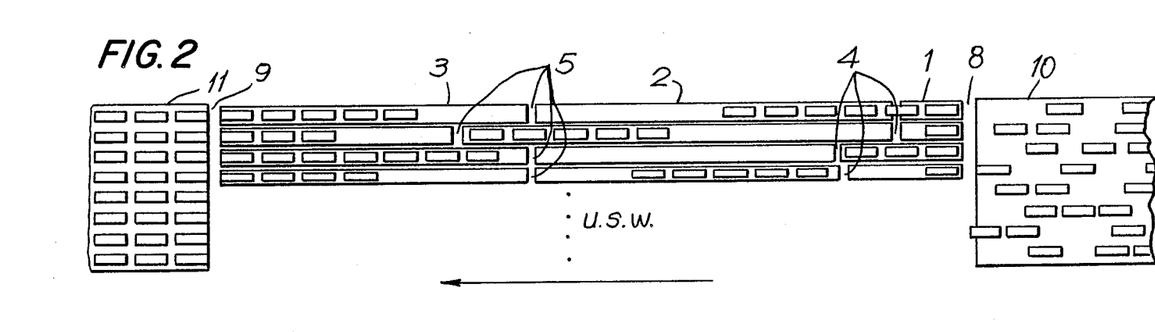
FIG. 2 is a plan view of the arrangement in accordance with the present invention of FIG. 1.
Figure 3:
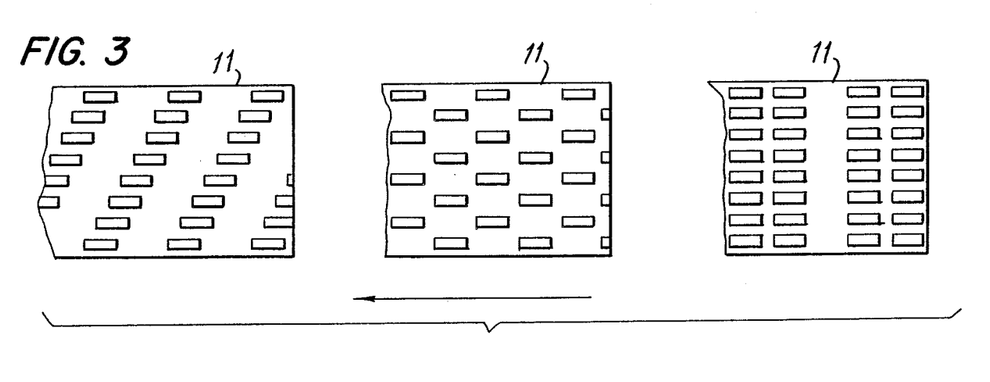
FIG. 3 is a view showing possible formations after the organization of piece goods in accordance with the present invention.

In accordance with another feature of the present invention, the arrangement includes sensors for controlling detection of the piece goods; the transporting device composed of any number of tracks; at least three conveyors as depicted in FIG. 1 provided in each track; the conveyors are arranged in an arrangement of fixed length one behind the other; and a transition is provided between two neighboring conveyors of each track; the transitions between the conveyors are movable in the transporting direction or opposite to the transporting direction; the speed of the individual conveyors in different tracks is changeable simultaneously or independently from one another; the speed of the individual conveyors in the same track is changeable independently from one another.

When the method is performed and the arrangement is designed in accordance with the present invention, it is possible to deal with pieces which arrive irregularly, in accordance with the distribution, after one another and in any number of tracks near one another, and to change the thus arrived pieces in their position in contact-free manner, so as to produce at the outlet of the arrangement rows, lines or groupings of any type with a periodical repetition.

The arrangement in accordance with the present invention leads to lower manufacturing expenses and especially avoids the disadvantages of the arrangement described in the German document DE-OS 2,711,039. Namely, the drive of the roller pair to be brought into action via only one run of the belt covers the double path as compared a displaceable gap or transition, and since this displacing device must be arranged in the band head, this limits the traveling path of the band gap to maximum the half of the structural length of the conveyor. Also the use of the active length of the conveyor of the construction disclosed in the German document DE-OS 3,147,590 is significantly reduced by the arrangement of all displaceable rollers on a carriage and by the aligned arrangement of the linear drive. The above mentioned advantages of the inventive arrangement are also true for various structural modifications.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG, 8 is a side view of a possible embodiment of the arrangement in FIG. 1.

DESCRIPTION OF THE PREFERRED EMBODIMENTS

An arrangement shown in FIG. 1 has three conveyors 1, 2 and 3 which are provided therebetween with two upper transitions 4 and 5 and two lower transitions 6 and 7. They are built in a frame which can be constructed in a conventional manner so that a product to be transported runs from a supply conveyor 10 through the above mentioned conveyors 1, 2, 3 to a discharge conveyor 11 for discharging the goods. The conveyors 1 and 3 of FIG. 1 respectively, the conveyors 1 and 2 of each of the conveyor-units in FIG. 6, respectively, FIG. 7 with their fixed rollers 12-17 are identical and are arranged mirror-symmetrically. Their drive is performed selectively through one of the fixed rollers 12-17 from motors 31 and 33 which have an adjustable rotary speed.

Figure 4:
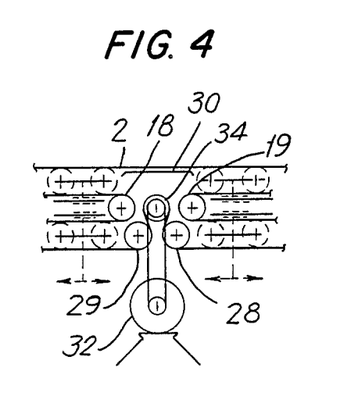
FIG. 4 is a view showing a possible fragment of the arrangement of FIG. 1 in accordance with the invention.
Figure 5:
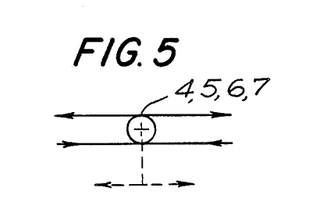
FIG. 5 is a schematic diagram showing the kinematics of the transition in accordance with the present invention.

The conveyor 2 in FIG. 1 can also have a symmetrical construction. It is driven through a fixed roller 18 from a motor 32 with an adjustable rotary speed. For heavier structures, it is advantageous to select a construction shown in FIG. 4, in which a drive roller 34 with required greater diameter can be provided.

Figure 8:
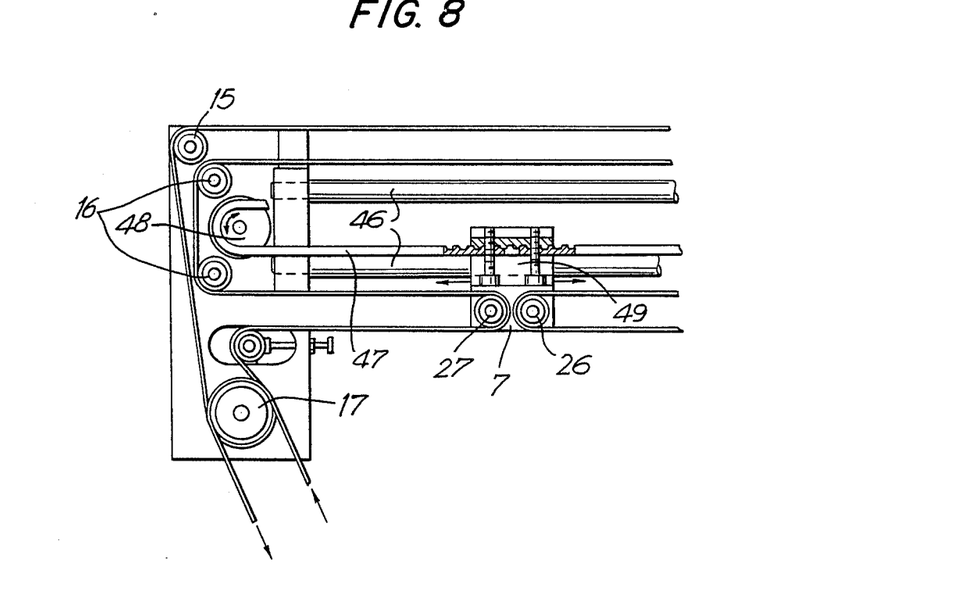
Figure 9:
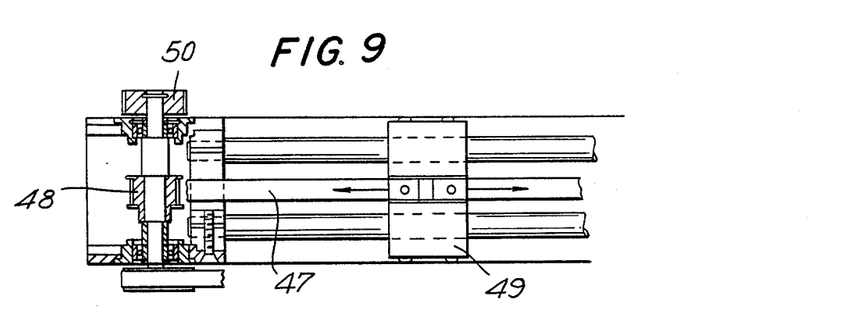
FIG. 9 is a plan view of the arrangement of FIG. 8.

The transitions 4-7 arranged between the conveyors 1-3 are formed so that respectively the axes of deviating rollers of one transition are connected with one another, and mounted on a side which runs along a guideway consisting of a bar as exemplified in FIG. 8 and FIG. 9 for transition 7. By this the rollers can move together in direction of the goods to be transported as shown in FIG. 1.

Because of this construction, all three conveyors 1-3 can be acted upon by only one tensioning roller 19 with the required run tensioning.

The arrangement of the conveyors is formed so that during displacement of one of the lower transitions 6, 7 which as depicted in FIG. 1 are well accessible for arranging a linearly acting drive 42, the respective opposite transitions 4, 5 move over the same path length, but in an opposite direction.

The movement of the mutually coupled transitions 6 and 4 remain independent from the movements of the mutually coupled transitions 7 and 5, and vice versa. Also, the separately adjustable speeds of the three conveyors 1, 2, 3 are independent from the movements of the transitions.

Figure 7:
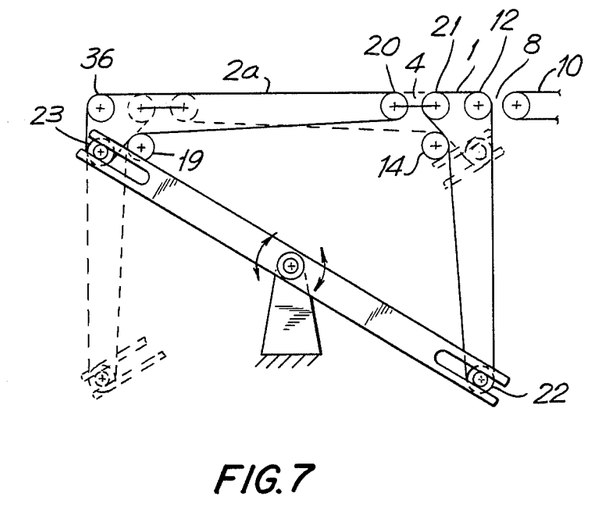
FIG. 7 is a side view of a possible embodiment of the arrangement of FIG. 6.

FIGS. 6 and 7 show possible embodiments of two required displacement band units. In these embodiments the conveyor 2 of FIG. 1 is replaced by two mirror-symmetrical conveyors 2a and 2b the construction and dimensions of which are identical with a respective conveyor 1 or 3 in FIG. 1. This permits the application of only one type of conveyor and may reduce the investment of the apparatus. As the function of said conveyors must be the same as that one of conveyor 2 in FIG. 1, it is necessary to drive pulleys 18 and 19 in the embodiment of FIG. 6 synchronously and at the same speed.

FIG. 7 shows an enlargement of the right one of the conveyor units of FIG. 6, comprising the conveyors 1 and 2a wherein the conveyors themselves and the means for moving the transition 4 give an example for conceivable modification. The lower transition 6 in said modification comprises again the rollers 22 and 23, but instead of running on a horizontal moving slide the movement is induced by a swinging lever 43 in the vertical direction. This may be of some advantage in the case of production under the condition of dirt and dust.

FIGS. 8 and 9 give an example for a possible embodiment of the downstream end of the conveyor 3, showing a slide 49 of the transition 7, path 46 for the slide to move on, modified belt driving facilities 17 in comparison to that of FIG. 1 and gives a possible example for alternative driving means for moving the slide of the transition 7 using a toothed belt. According to the plan view of FIG. 9, the belt is activated by a motor working on toothed wheels 50 and 48 which are mounted on a common shaft.

With the inventive arrangement, several operational courses can be pursued, which lead to the same results. It is well illustrated in the following described operational mode with simulation running on a computer. Naturally it is to be understood that failing pieces which are not obtained by the transporting device or excessive pieces which exceed the inner buffer capacity cannot be taken back. This means that for each place of the formation to be formed within a limited time also one piece at an inlet of the arrangement becomes available, or in other words, the mean rate of arrival of the pieces must correspond to the mean rate of discharge of the pieces. When this is not the case, unoccupied places remain in the outlet grouping, or a device is required for reducing the number of pieces for the operation of the arrangement. What is important is that the pieces can be supplied irregularly, for example in accordance with a distribution which may be a Gauss distribution. In the examplary embodiment of the arrangement which is described herein, for an output of 100 rows per minute for example up to 5 pieces can be supplied in direct sequence, or in other words with a minimum distance of the pieces from one another or with such gaps corresponding to the length of said 5 pieces enlarged by those interstices they would have inbetween them when arriving according to the mean rate of arrival, without deviating from the selected grouping in the outlet.

The rate of arrival and the discharge rate can be changed in correspondence with one another. It can be required to process a variable arrival rate, for example, for the case when variations in the production quantity of the pre-arranged machines take place. It is then required to design the arrangement and the control for greatest possible arrival rate. Reduced supply quantities lead then to respective gaps between the groupings, and in an extreme case between individual rows at the outlet of the arrangement.

The operational principle in one single track is as follows:

I. Predetermined number of pieces (preferably 5) which reach the device at the transition 8 with arbitrary distance, with known average arrival rate are arranged in a row one behind the other on the conveyor 1 so that the pieces do not contact one another, but their distances from one another are small and have the same length.

II. The so-collected group of pieces (set) is transported by the co-running transitions 4 and 5 in the movement separately from preceding and subsequent groups on the conveyor 2, and from it the pieces are moved by the transition 5 running in front of the group, to close the with the pieces which are located on the conveyor 3 from the previous cycle and;

III. The conveyor 3 cyclically moves the pieces in the desired sequence via the transition 9 onto the conveyor 11 for discharge. This process can b=performed in any number of tracks synchronously or with a selected time offset. More particularly, the above described processes including the steps I, II, III are performed in each track in accordance with the following course:

A sensor 40 which can be formed as a photocell recognizes the front edge of a piece when it enters the transition 8. The control can be performed so that the conveyor 1 runs further with the speed V1 by the amount equal to the length of the piece. The length of the piece can be known and constant, or on the other hand it can be detected by the above mentioned sensor or another sensor during running. Because of non-avoidable time constants for starting and breaking of the conveyor elements, it can be required that a fixed distance be provided between the pieces which are arranged in a row on the conveyor 1. This distance can be produced in a simple manner in that the speed V1 of the conveyor 1 can be selected marginally greater than the speed of the supply conveyor 10 by a predetermined amount. The speed V1 in the event of the piece length of 60 mm is under consideration here and a throughput of 100 pieces per minutes and track can amount for example to 12-15 m/min. In the same fashion this distance can be produced on conveyors which are arranged before the device.

When the conveyor 1 takes the first piece, and the second piece follows immediately after it, the conveyor 1 runs further without stopping with speed V1 until it takes also said second piece in its complete length, wherein a distance from the second piece to the first piece is produced. It is required that the transition 4 runs simultaneously with the speed V1 before the first piece, and thereby the transporting and cycling processes of the conveyors 2 and 3 which will be described hereinbelow, are performed independently from these movements.

The conveyor 1 runs always when one piece enters the transition 8, takes it and stops as long as no further piece enters it, or in other words, when a gap exists between two pieces on the supply conveyor which runs with a constant speed.

In the same fashion as the conveyor 1 runs cyclically, the transition 4 moves respectively before the first piece until the conveyor 2 is emptied from pieces from the preceding set. Then the conveyor 2 moves cyclically synchronously with the conveyor 1 so as to take further pieces when necessary, and the transition 4 runs under the pieces arranged in a row without affecting the latter, with increased speed such as $V2=2\ V1$, to its initial position.

Since in the starting phase a preceding set does not exist, the transitions 4 and 5 can be retained for the first set in their initial position. Thereby the above mentioned number of the pieces are arranged on the conveyors 1 and 2 in a row one after the other in uniform distances.

When a set of 5 pieces is accumulated on the conveyor 2, the transportation of these pieces toward the discharge side of the device starts. For this purpose, the conveyor 2 is switched to the speed $V2=2\ V1$. A sixth piece can lie already on the conveyor 1 which can again start accumulation as described hereinabove, wherein the transition 4 can perceive its separating function. When the first piece from the five pieces reaches the transition 5, it runs directly before the front piece until it reaches the end of the preceding set which can now partially be located for the cyclical discharge on the conveyor 3. Since in the starting phase no pieces are located on the conveyor 3, the transition from the conveyor 2 to the conveyor 3 can take place without performing separating function by the transition 5. It is fixed in the event of the first set in its initial position.

The conveyor 2 is now turned on synchronously with the conveyor 3 and the transition 5 runs with preferably V2=2 V1 under the pieces to its initial position back, so that all pieces of this set lie now for cyclical discharge on the conveyor 3. Later with this process, also the return of the transition 4 is performed, since it is necessary that the conveyor 2 must be emptied inbetween. A new set can be transported thereby.

When the device operates with several tracks, then the step of "accumulating" and "transporting" runs in individual tracks independently from one another, and because of the accidental arrival of the pieces are offset in time.

In contrast to this, the synchronized placement from the adjacently arranged conveyors 3 of all tracks onto the discharge conveyor 11 is performed in an organized fashion or in other words in accordance with desired layout in equal cycle, in alternating cycle, or in other cycle sequences. However, the requirement must be maintained that in each track the average arrival rate must correspond to the average departure rate, so that on the one hand, the number of pieces ready for cyclical placement on the conveyor 3 does not exceed the capacity of this conveyor, and on the other hand, always one piece is available for cyclical placement in each track so that desired layout pattern on the discharge conveyor 11 can be achieved without gaps.

The cyclical discharge, for example in close transverse rows is performed preferably in that the control provides for selective time cycles with which the conveyors 3 of all tracks run, and synchronously respectively one piece is placed on the continuously running discharge conveyor 11, then stopped, and during next time cycle a further piece is placed, etc.

The conveyor stretch per start of the conveyor 3, as well as the accumulating and transporting steps, can be examined by photocells 40 or other sensors which are mounted on the transitions, and the beginning and the end of the pieces can be signalled on the control. The control can be formed as a sequential control 44, for example a memory programmable control 44. It can however be advantageous to use a process computer for reducing the sensor-related monitoring and performing in extreme cases only a one-time recognition of each piece at the transition 8.

The length of the individual bands is a function of the length of the piece, the dispersion of the arrivals on the supply conveyor, the frequency of the arrivals, the friction value of the pieces relative to the conveyor, and thereby decelerations, and also of the utilized strategy for controlling. With the length of pieces of 60 mm and an arrival rate of 100 pieces per minute, the following average lengths takes place for each track:

Conveyor 1 in shrinking condition appr. 1 piece length = 60 mm

Conveyor 2 in condition in which it is extended on both sides appr. 15 piece length for 1 set of 5 pieces =900 mm in condition in which it is shrinking at both sides appr. 2 piece lengths =120 mm Conveyor 3 in extended condition appr. 9 piece lengths for 1.5 sets of respectively 5 pieces = 540 mm In the event of higher dissipation of the arrivals, the length of the conveyor 3 is selected to be greater.

It will be understood that each of the elements described above, or two or more together, may also find a useful application in other types of constructions differing from the types described above. Not shown elements are well known.

While the invention has been illustrated and described as embodied in a method of and an arrangement for transporting piece goods and for organized changing their position, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method of transporting piece goods and organized changing their position, comprising the steps of transporting goods in a plurality of substantially parallel tracks by a transporting device from a supply conveyor to a discharge conveyor spaced from one another in a predetermined direction; determining a position of the goods by sensing means at least in the region between the supply conveyor and the transporting device; supplying the goods to each track of the transporting device with a mean value of arrival and a variance of arrival; providing in each track of the transporting device at least three transporting conveyors, and transitions between two adjacent ones of the transporting conveyors; changing a speed of the transporting conveyors of the transporting device; and moving a respective one of the transitions in said direction to change their position, so that by changing the position of the transition and the speed of the transporting conveyors pieces or groups of goods can change their position separately from other pieces or groups of goods so as to be accelerated or decelerated.

2. A method as defined in claim 1; and further comprising the step of discharging the goods from the discharge conveyors for further treatment.

3. A method as defined in claim 2, wherein said discharging step includes supplying the goods from the discharge conveyor to a packaging machine.

4. A method as defined in claim 1, wherein said discharging step includes discharging pieces of the goods separately from each of the tracks.

5. A method as defined in claim 1, wherein said discharging step includes discharging pieces of the goods jointly from each of the tracks.

6. A method as defined in claim 1, wherein said sensing step includes sensing by the sensing means which has at least one sensor arranged in said region.

7. A method as defined in claim 1, wherein said supplying step includes supplying the goods with such distances therebetween, which are different from track to track.

8. A method as defined in claim 1, wherein said supplying step includes supplying the goods with distances therebetween, which are different in a same one of the tracks of the supply conveyors.

9. A method as defined in claim 1, wherein said moving step includes moving a respective one of the transitions in a transporting direction.

10. A method as defined in claim 1, wherein said moving step includes moving a respective one of the transitions in a direction which is opposite to a transporting direction.

11. A method as defined in claim 1, wherein said changing the position of pieces or groups of goods includes changing their position over a predetermined time.

12. A method as defined in claim 1, wherein said changing the position of pieces or groups of goods includes changing their position over a predetermined path length.

13. A method as defined in claim 1, and further comprising the step of using a signal of the sensing means for controlling the position of the transitions.

14. A method as defined in claim 1, and further comprising the steps of using a signal of the sensing means for controlling the speed of the transporting conveyors.

15. A method as defined in claim 1, and further comprising the steps of using a signal of the sensing means for controlling the position of the transitions and the speed of the transporting conveyors.

16. A method as defined in claim 13, wherein said controlling step includes controlling by means of a programmable computer.

17. A method as defined in claim 14, wherein said controlling step includes controlling by means of a programmable computer.

18. An arrangement for transporting piece goods and organized changing their position, comprising a plurality of tracks each including a supply conveyor, a transporting device and a discharge conveyor spaced from one another in a predetermined directions, so that goods are supplied to said transporting device with a mean value of arrival and a variance of arrival, and the transporting device including at least three transporting conveyors per each track and transitions between two adjacent ones of said transporting conveyors; sensing means for determining a position of the goods in a region between said supply conveyor and said transporting device; means for changing a speed of said transporting conveyors of said transporting device; and means for moving a respective one of said transitions in said direction to change its position, so that by changing the position of said transitions and the speed of said transporting conveyors pieces or groups of goods can change their position separately from other pieces or groups of goods so as to be accelerated or decelerated.

19. An arrangement as defined in claim 18, wherein said sensing means includes at least one sensor arranged in said region.

20. An arrangement as defined in claim 18, wherein said moving means is arranged so as to move said transitions in a transporting direction.

21. An arrangement as defined in claim 18, wherein said moving means is arranged so as to move said transitions in a direction which is opposite to a transporting direction in said region.

22. An arrangement as defined in claim 18, wherein said changing means is arranged to change the speed of said transporting conveyors which are for the purpose of discharging said piece goods simultaneously in all of said tracks.

23. An arrangement as defined in claim 18, wherein said changing means is arranged to change the speed of said transporting conveyors independently in respective ones of said tracks.

24. An arrangement as defined in claim 18, wherein said changing means is arranged to change the speed of said transporting conveyors in a respective one of said tracks independently of one another.

25. An arrangement as defined in claim 18, wherein each of said transporting conveyors includes a plurality of movable deviating rollers and a belt which runs on said rollers.

26. An arrangement as defined in claim 18, wherein each of said transitions is coupled to an additional transition and are arranged so that when one of said first-mentioned transitions is moved in one direction a respective one of said additional transitions is moved in another direction which is opposite to said one direction.

27. An arrangement as defined in claim 26, wherein each cf said first-mentioned transitions coupled to their respective one of said additional transitions are arranged so that they move in opposite directions with identical speeds.

28. An arrangement as defined in claim 26, wherein each of said first-mentioned transitions coupled to their respective one of said additional transitions are arranged so that they move in the opposite directions over identical distances.

29. An arrangement as defined in claim 18, wherein said transporting conveyors of said transporting device have different length.

30. An arrangement as defined in claim 18, wherein said moving means includes a linear drive arranged to move said transitions.

31. An arrangement as defined in claim 18, wherein said moving means includes a drive with pulling means arranged to move said transitions.

32. An arrangement as defined in claim 31, wherein said pulling means includes means selected from the group consisting of a strap, a rope, a belt, a toothed belt, a chain and their combinations.

33. A method as defined in claim 18, and further comprising means for tensioning said transporting conveyors of said transporting device and including a single roller which is displaceable to simultaneously tension all of said transporting conveyors of a respective one of said tracks.

34. A method as defined in claim 18, and further comprising means for driving at least one of said transporting conveyors, said driving means including rollers.

35. An arrangement as defined in claim 18, wherein said moving means includes a plurality of rotatable members, a common shaft supporting all said rotatable members, and pulling means guided by said rotatable members and connected with a respective one of said transitions.

36. An arrangement as defined in claim 35, wherein said rotatable members are selected from the group consisting of wheels and rollers.

37. An arrangement as defined in claim 35, and further comprising additional transitions each connected with a respective one of said first-mentioned transitions and movable in an opposite directions to the latter, said pulling means being also connected with a respective one of said additional transitions.

38. An arrangement as defined in claim 18, wherein said sensing means is formed as photoelectric means.

39. An arrangement as defined in claim 18, wherein said sensing means is formed as electric means.

40. An arrangement as defined in claim 18, and further comprising means for controlling a direction and a speed of the movement of said transitions and the change of the speed of said transporting conveyors and including a programmable computer.

41. An arrangement as defined in claim 18, and further comprising means for discharging the goods from the discharge conveyor consisting of only one of said tracks.

42. An arrangement as defined in claim 41, and further comprising a receiving element arranged to receive goods from the discharge conveyor consisting of only one of said tracks and formed as a chain.

43. An arrangement as defined in claim 42, wherein said chain is a part of a packaging machine for packaging the goods.

44. An arrangement as defined in claim 18, wherein said transporting conveyors includes means selected from the group consisting of a strap, a rope, a belt, a toothed belt, a chain and their combinations.

45. An arrangement for transporting piece goods and organized changing their position, comprising a plurality of substantially parallel tracks each including a supply conveyor, a transporting device and a discharge conveyor spaced from one another in a predetermined direction, so that goods are supplied to said transporting device with a mean value of arrival and a variance of arrival, and the transporting device including at least three transporting conveyors per each track and transitions between two adjacent ones of the transporting conveyors; sensing means for determining a position of the goods in a region between said supply conveyor and said transporting device; means for changing a speed of said transporting conveyors of said transporting device; and means for moving a respective one of said transitions in said direction to change its position, so that by changing the position of said transitions and the speed of said transporting conveyors pieces or groups of goods can change their position separately from other pieces or groups of goods so as to be accelerated or decelerated, at least one of said transporting conveyors including two conveyor elements arranged one after the other and movable synchronously.

* * * * *